(12) United States Patent
Chin et al.

(10) Patent No.: US 10,331,843 B1
(45) Date of Patent: Jun. 25, 2019

(54) SYSTEM AND METHOD FOR VISUALIZATION AND ANALYSIS OF A CHIP VIEW INCLUDING MULTIPLE CIRCUIT DESIGN REVISIONS

(71) Applicant: Altera Corporation, San Jose, CA (US)

(72) Inventors: Choi Phaik Chin, Bayan Lepas (MY); Teik Chuan Tan, Kulim (MY); Kian Yong Tiu, Bayan Lepas (MY)

(73) Assignee: Altera Corporation, San Jose, CA (US)

( * ) Notice: Subject to any disclaimer, the term of this patent is extended or adjusted under 35 U.S.C. 154(b) by 62 days.

(21) Appl. No.: 15/277,406

(22) Filed: Sep. 27, 2016

(51) Int. Cl.
 *G06F 17/50* (2006.01)

(52) U.S. Cl.
 CPC ........ *G06F 17/5081* (2013.01); *G06F 17/505* (2013.01); *G06F 17/5054* (2013.01); *G06F 17/5072* (2013.01); *G06F 17/5077* (2013.01); *G06F 2217/02* (2013.01); *G06F 2217/78* (2013.01); *G06F 2217/84* (2013.01)

(58) Field of Classification Search
 CPC ............. G06F 17/5081; G06F 17/5077; G06F 17/5054; G06F 17/505; G06F 17/5072; G06F 2217/78; G06F 2217/84; G06F 2217/02
 See application file for complete search history.

(56) References Cited

U.S. PATENT DOCUMENTS

| | | | | |
|---|---|---|---|---|
| 8,566,758 B2* | 10/2013 | Moriyama | .......... | G06F 17/5045 716/100 |
| 8,689,169 B2* | 4/2014 | Fischer | ............... | G06F 17/5068 716/100 |
| 8,769,455 B1* | 7/2014 | Singh | ................... | G06F 17/505 716/101 |
| 8,826,211 B1* | 9/2014 | Sood | .................... | G06F 17/5077 716/113 |
| 9,870,440 B2* | 1/2018 | Kalte | .................. | G06F 17/5054 |
| 2002/0162077 A1* | 10/2002 | Jeng | .................... | G06F 17/5045 716/102 |
| 2003/0145300 A1* | 7/2003 | Tran | .................... | G06F 17/5068 716/124 |

(Continued)

OTHER PUBLICATIONS

"InTime"; Plunify; 2016; http://www.plunify.com/en/product.php; last accessed Sep. 27, 2016.

(Continued)

*Primary Examiner* — Nha T Nguyen
(74) *Attorney, Agent, or Firm* — Fletcher Yoder, P.C.

(57) ABSTRACT

A method includes receiving a first circuit design, deriving circuit design revisions based on the first circuit design, receiving revision information for each of the circuit design revisions that is output as a result of compilation of the circuit design revisions, extracting location information, timing information, or both for resources from the revision information, for each of the circuit design revisions, mapping the resources into a chip view based on the location information, the timing information, or both. The chip view includes a virtual visualization of an actual physical chip and the resources are mapped to their actual locations on the virtual visualization as they would be implemented on the actual physical chip. The method also includes generating the chip view of the circuit design revisions that displays a report specific to one or more properties of the circuit design revisions.

19 Claims, 10 Drawing Sheets

(56) References Cited

U.S. PATENT DOCUMENTS

| | | | | |
|---|---|---|---|---|
| 2006/0101368 A1* | 5/2006 | Kesarwani | G06F 17/5045 | 716/137 |
| 2008/0172640 A1* | 7/2008 | Fenkes | G06F 17/5045 | 716/51 |
| 2009/0199143 A1* | 8/2009 | Schlotman | G06F 17/5031 | 716/113 |
| 2009/0259981 A1* | 10/2009 | Patel | G06F 17/5072 | 716/119 |
| 2009/0313596 A1* | 12/2009 | Lippmann | G06F 17/505 | 716/126 |
| 2010/0169847 A1* | 7/2010 | Gupta | G06F 17/5063 | 716/122 |
| 2011/0119544 A1* | 5/2011 | Hogan | G06F 17/5081 | 714/734 |
| 2012/0023472 A1* | 1/2012 | Fischer | G06F 17/5068 | 716/122 |
| 2012/0047479 A1* | 2/2012 | Paris | G06F 17/5081 | 716/112 |
| 2012/0192134 A1* | 7/2012 | Hogan | G06F 17/5081 | 716/112 |
| 2013/0074033 A1* | 3/2013 | Hall | G06F 17/5045 | 717/109 |
| 2016/0018979 A1* | 1/2016 | Sunder | G06F 1/10 | 715/771 |
| 2016/0246911 A1* | 8/2016 | Subramaniam | G06F 17/5068 | |
| 2016/0342720 A1* | 11/2016 | Veneris | G06F 17/5045 | |
| 2017/0091685 A1* | 3/2017 | Karabin | G06Q 10/06313 | |
| 2017/0235848 A1* | 8/2017 | Van Dusen | G06F 17/30979 | 705/12 |

OTHER PUBLICATIONS

"About Design Space Explorer II"; Altera Corporation; http://quartushelp.altera.com/15.0/mergedProjects/optimize/dse/dse_about_dse.htm; last accessed Sep. 27, 2016.

"Altera Quartus"; Wikipedia; https://en.wikipedia.org/wiki/Altera_Quartus; Sep. 15, 2016.

"Design Tools"; Xilinx Inc.;https://www.xilinx.com/products/design-tools/vivado.html; last accessed Sep. 27, 2016.

"Lattice Diamond Software"; Lattice Seminconductor; 2016; http://www.latticesemi.com/latticediamond; ast accessed Sep. 27, 2016.

* cited by examiner

SYSTEM AND METHOD FOR VISUALIZATION AND ANALYSIS OF A CHIP VIEW INCLUDING MULTIPLE CIRCUIT DESIGN REVISIONS

BACKGROUND

The present disclosure relates generally to integrated circuits (ICs), which may include programmable logic devices (PLDs) such as field programmable gate arrays (FPGAs). More particularly, the present disclosure relates to visualizing and analyzing a chip view including numerous circuit design revisions to be potentially implemented on the ICs.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Integrated circuits (ICs) take a variety of forms. For instance, programmable logic devices (PLDs) such as field programmable gate arrays (FPGAs) are ICs that may be highly flexible devices. FPGAs include logic that may be programmed after manufacturing to provide functionality that the FPGA may be designed to support. Thus, FPGAs contain programmable logic, or combinational logic blocks, that may perform a variety of functions on the FPGAs, according to a circuit design of a user. In a programmable logic circuit design, groups of combinational logic elements may be separated by registers. At each clock cycle, a data signal may exit one register, be processed through a first group of combinational logic elements, and enter another register to wait for the next clock cycle to begin. At the next clock cycle, the data signal may continue through a second group of combinational logic elements into a third register, and so forth. Thus, the way that the registers separate different groups of combinational logic elements may have a substantial impact on the maximum achievable clock signal frequency by which the data signal may pass through the programmable logic circuit design. The maximum clock signal frequency may depend on how quickly the data signal can pass through a group of combinational logic elements between any two registers of the circuit design. One technique to improve the performance of the circuit design is through register retiming, which involves adjusting the placement of the registers back and forth across different groups of combinational logic to improve the maximum achievable clock signal frequency. Performing retiming on an initial circuit design may result in one or more revisions of the initial circuit design.

Certain computer-aided design (CAD) tools enable designers to choose various optimization options when generating revisions using retiming. For example, the optimization options may relate to synthesis, place-and-route, physical synthesis flow, and the like. Further, these computer-aided design tools enable designers to create multiple revisions with different settings and/or assignments. The sheer number of optimization options, settings, and/or assignments available may lead a designer to generate multiple revisions when searching for a satisfactory revision using the computer-aided design tool.

To aid in keeping track of the revisions, certain computer-aided design tools may provide reporting capabilities that compare the results of the revisions in a tabular format. However, the reporting capabilities do not provide insight on how certain optimization options, assignments, and/or settings influence the outcome (e.g., timing, power consumption, compilation) of the revisions as compared to each other. That is, current reporting capabilities are insufficient insofar as enabling determining which combination of optimization options, assignments, and/or settings is most desirable to meet the designer's circuit design criteria.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to software programs, methods, and devices for generating a chip view that is a virtual visualization of an actual physical chip that includes the resources of various circuit design revisions overlaid on the virtual visualization. In certain instances, a designer may create numerous revisions with different optimization options, settings, and/or resource placements. The chip view may enable the designer to visualize and analyze properties (e.g., timing, power, compilation) of the revisions that results from compilation. In some embodiments, the chip view may display a comparison of placements of specific nodes, partitions, blocks, and the like from the various revisions. As may be appreciated, the chip view may ease the implementation comparison among multiple revisions and help designers understand the relationship of selected optimization options, settings, and/or placements with various properties produced by the implemented revisions.

Various refinements of the features noted above may be employed in relation to various aspects of the present disclosure. Further features may also be incorporated in these various aspects as well. These refinements and additional features may be employed individually or in any combination. For instance, various features discussed below in relation to one or more of the illustrated embodiments may be incorporated into any of the above-described aspects of the present invention alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Some embodiments of the present disclosure generally relate to a circuit design component that enables visualization and analysis of result data (e.g., timing, fitting, power, etc.) related to multiple revisions within a chip view. The chip view may refer to a visualization of an actual physical chip, actual locations of resources used in the multiple revisions on the physical chip, and/or actual data paths (e.g., critical paths) between the resources used in the multiple revisions on the physical chip. Such a visualization may enable a designer to analyze and compare the results of the revisions more readily than a report of resulting properties of the numerous revisions in tabular format. That is, the chip views may provide insight to the designer as to which revision provides the most desirable combination of optimization options, settings, and/or placements to achieving certain criteria (e.g., maximum clock signal frequency). Indeed, the chip view may aid the designer in understanding the impact of certain optimization options, settings, and/or assignments on the implementation outcome of the revisions.

Figure 1:
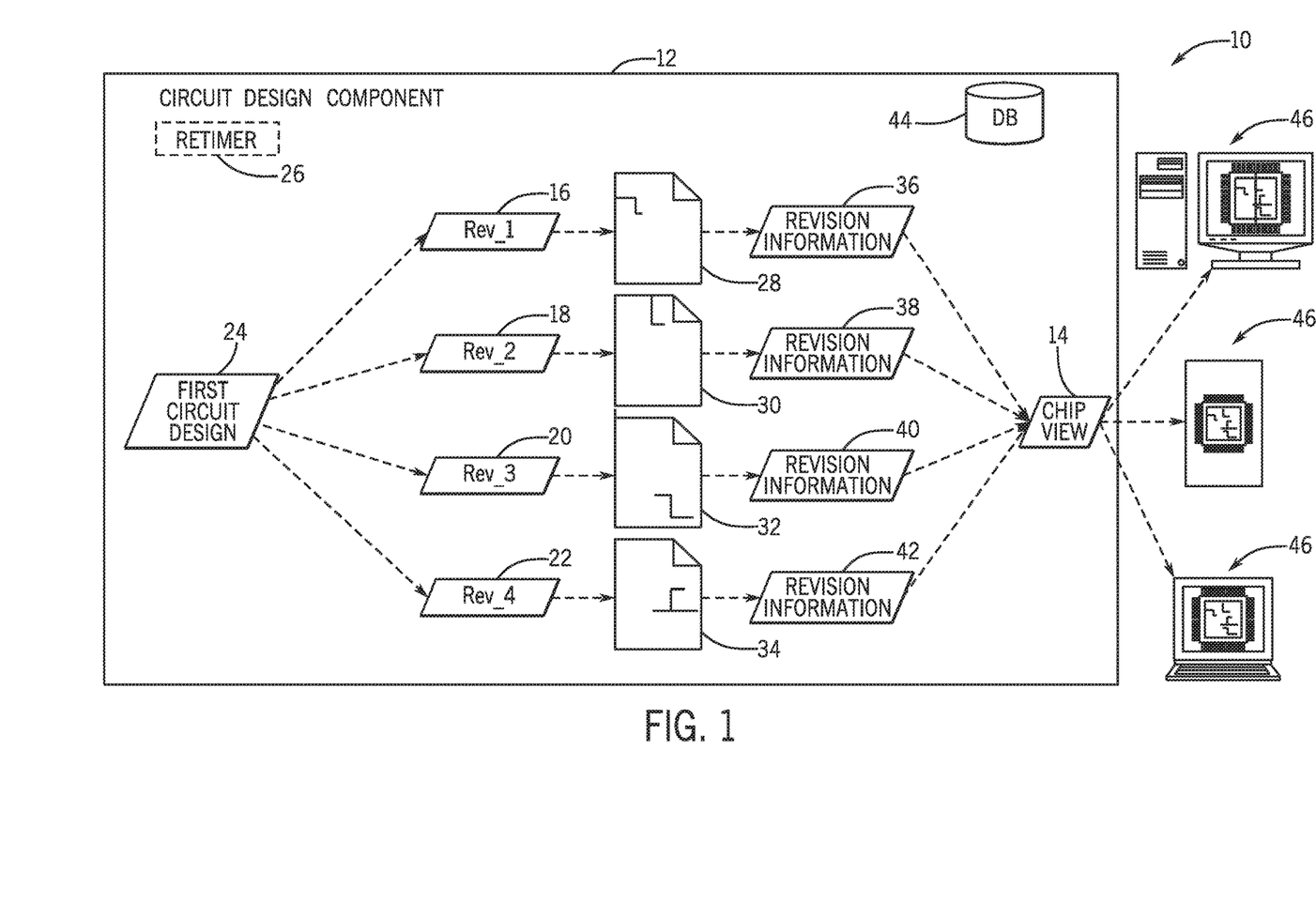
FIG. 1 illustrates a block diagram of a system that utilizes a circuit design component to generate a chip view of multiple revisions of a circuit design, in accordance with an embodiment.

With the foregoing in mind, FIG. 1 illustrates a block diagram of a system 10 that utilizes a circuit design component 12 to generate a chip view 14 of multiple revisions 16, 18, 20, and 22 of a first circuit design 24, in accordance with an embodiment. The circuit design component 12 may represent a computer-aided design optimization tool. The first circuit design 24 and the various revisions 16, 18, 20, and 22 may be included in a project associated with the circuit design component 12.

The circuit design component 12 may include a retimer 26 that accepts the first circuit design 24 as input and determines the revisions 16, 18, 20, and 22 including circuit design changes to the first circuit design 24. In some embodiments, the circuit design changes made in the variations of the first circuit design 24 may be made in an attempt to maximize the performance of the clock signals feeding the first circuit design 24. It should be understood that performance of the clock signals refers to the frequency of the clock signals, since the frequency of a clock signal that drives some circuitry of the first circuit design 24 may be limited by the design of the circuitry driven by that clock signal. The circuit design changes made in the revisions 16, 18, 20, and 22 to enhance performance of the revisions 16, 18, 20, and 22 being fed the clock signals may include moving registers back and forth across combinational logic elements, removing asynchronous clears, converting asynchronous clears to synchronous clears, removing user directives, adding pipelining (adding registers on either side of an asynchronous clock transfer), and the like.

In addition, the circuit design component 12 may include multiple optimization options that are selectable by the designer. Each of the optimization options, when selected by the designer using the first circuit design 24, may cause a different revision to be generated. Optimization options may include advanced analysis and synthesis settings, as well as advanced fitter settings. Example advanced analysis and synthesis settings may include allowing shift register merging across hierarchies, allowing synchronous control signals, enabling automatic parallel synthesis, setting a carry chain length, enabling clock multiplexor protection, and the like. Example advanced fitter settings may include enabling auto delay chains, enabling auto global register control signals, enabling auto register duplication, enabling bus-hold circuitry, performing final placement optimizations, setting a fitter initial placement seed, and the like. Further, the circuit design component 12 may include options to enable the designer to select various assignments to apply in different revisions. For example, the assignments may relate to pin and location, analysis and synthesis, fitter, power estimation, timing, incremental compilation, and the like.

As may be appreciated, there are many possible combinations of optimization options, settings, and/or assignments that may be selected by the designer that may result in multiple revisions 16, 18, 20, and 22 of the first circuit design 24. The designer may leverage computing resources to generate the multiple revisions in parallel in an effort to find a circuit design that meets certain desirable criteria. Accordingly, in some embodiments, the circuit design component 12 provides a way to ease understanding the impact that certain implementation choices have on the final results of the multiple revisions in the form of the chip view 14. It should be noted that, instead of just comparing the final results of the implementations of the revisions, the chip view 14 depicts the actual implementation differences that lead to different results of the revisions 16, 18, 20, and 22.

Whether the designer directs the retimer 26 to automatically generate revisions by performing circuit design changes on the first circuit design 24 or the designer manually selects the optimizations, settings, and/or assignments to implement in the revisions, various files 28, 30, 32, and 34 may be generated as a result of compiling the revisions 16, 18, 20, and 22. Each of the various files 28, 30, 32, and 34 may be associated with a respective revision 16, 18, 20, and 22 and may include revision information 36, 38, 40, and 42 related to timing results of the implementation for the respective revision, location of resources (e.g., partitions, nodes, logic blocks) as implemented in the respective revision, and the like. The information dumped into the files 28, 30, 32, and 34 may have a predefined format. For example, the predefined format for the revision information may include the following: "<src_node|src_re> <src_loc> <dest_node|dest_re> <dest_loc> <delay>".

The predefined format for the files 28, 30, 32, and 34 may enable easy parsing and data extraction for the circuit design component 12. Thus, to generate the chip view 14, the circuit design component 12 may read the files 28, 30, 32, and 34 and extract the revision information 36, 38, 40, and 42 (e.g., location information for nodes and routing resources, timing results). In some embodiments, the circuit design component may include a database 44 in which the revision information 36, 38, 40, and 42 is stored. The circuit design component 12 may use the revision information 36, 38, 40, and 42 to map various nodes locations and connections locations in the chip view 14 and draw the nodes locations and connections locations to generate the chip view 14.

The chip view 14 may be displayed using a computing device 46, such as a desktop computer, a smartphone, a tablet, a laptop, or the like. It should be noted that the circuit design component 12 may reside in the memory of a computing device 46 or may reside on a device (e.g., server) remote from the computing device 46 and provide the chip view via a network (e.g., Internet, local area network) to the computing device 46. In this way, the circuit design component 12 may function as part of a cloud-based system that receives the revisions 16, 18, 20, and 22 and revision information 36, 38, 40, and 42 and generates and delivers the chip view 14 to a requesting computing device 46.

Additionally or alternatively, the system 10 may employ a client-server architecture where the circuit design component is available via a server to the client computing device 46. As such, the client may send a request for the chip view 14 to the server. In response, the circuit design component 12 may query the database 44 for the revision information 28, 30, 32, and 34, and generate the chip view 14 to be sent to the client computing device 46 for display. Further, the database 44 may reside on a server remote from the circuit design component 12. In such an embodiment, the circuit design component 12 may reside on the computing device 46. When the user requests the chip view 14, the circuit design component 12 may query the remote database 44 to retrieve the revision information 36, 38, 40, and 42 and then generate the chip view 14 using the revision information 36, 38, 40, and 42.

It should be understood that the visualization provided by the chip view 14 may provide several benefits to the designer. For example, the chip view 14 enables comparing and analyzing the implementations of the revisions 16, 18, 20, and 22 that lead to different results. The results may include timing information, such as visual depiction of the critical path of a revision including a source node, a destination node, and a path between the source node and the destination node. A critical path may refer to the path in a circuit design that results in the longest delay. Thus, the circuit design can only be as fast as the critical path. As may be appreciated, visually displaying the critical path of different revisions may enable the designer to determine how to modify the implementation to attain a critical path that still allows the circuit design to satisfy the desired timing criteria.

The results that are depicted by the chip view 14, may also include power consumption results. That is, the chip view 14 may visually depict the portions (e.g., nodes, partitions, circuitry components) of the revisions 16, 18, 20, and 22 where more or less power is consumed. Also, the results may include compilation results that enable comparing connections between circuitry components and/or placement of specific resources (e.g., nodes, partitions, circuitry components) for the revisions 16, 28, 20, 22.

In some embodiments, the circuit design component 12 may provide an option for the designer to select a fitter initial placement seed. The fitter initial placement seed specifies a starting value a fitter uses when randomly determining the initial placement for the current circuit design. The value may be any non-negative integer value. Changing the value may cause the circuit design to be fit differently to the physical chip. As such, as described in more detail below, the chip view 14 provides a visualization of the revisions 28, 30, 32, and 34 that result from different fitter initial placement seeds. The visualization may enable comparing and analyzing the placement of the circuitry components, partitions, and/or nodes and the timing paths and/or power dissipation of the revisions that result from different fitter initial placement seeds.

Figure 2:
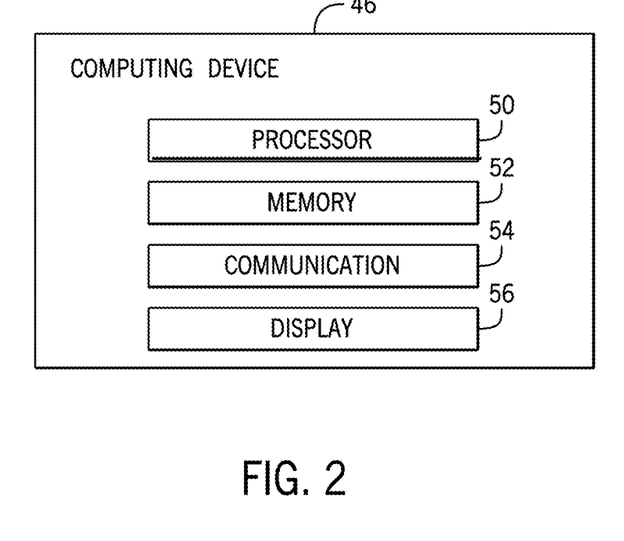
FIG. 2 illustrates a block diagram of example components of a computing device used to execute the circuit design component of FIG. 1, in accordance with an embodiment.

Turning now to FIG. 2, a block diagram of example components of the computing device 46 used to execute the circuit design component 12 of FIG. 1 is illustrated in accordance with an embodiment. As shown, the computing device 46 may include a processor 50, a memory 52, communication circuitry 54, a display 56, and the like.

The processor 50 may be any type of computer processor or microprocessor capable of executing computer-executable code. Moreover, the processor 50 may include multiple processors or microprocessors, one or more "general-purpose" processors or microprocessors, one or more special-purpose processors or microprocessors, and/or one or more application specific integrated circuits (ASICS), or some combination thereof. For example, the processor 50 may include one or more reduced instruction set (RISC) processors.

The memory 52 may be any suitable articles of manufacture that can serve as media to store processor-executable routines, code, data, or the like. These articles of manufacture may represent computer-readable media (e.g., any suitable form of memory or storage) that may store the processor-executable code or routines used by the respective processor 50 to perform the presently disclosed techniques. For example, the memory 52 may include volatile memory (e.g., a random access memory (RAM)), nonvolatile memory (e.g., a read-only memory (ROM)), flash memory, a hard drive, or any other suitable optical, magnetic, or solid-state storage medium, or a combination thereof. The memory 52 may be used to store the computer instructions implementing the circuit design component 12, any data (e.g., the revision information 36, 38, 40, and/or 42, the chip view 14, etc.) generated by the circuit design component 12, and the like.

The communication circuitry 54 may be a wireless or wired (Ethernet) communication component. The communication circuitry 54 may meet industry standards, such as IEEE 802.11b/g. Also, the communication circuitry 54 may facilitate communication between the computing device 46 and other devices. For example, the communication circuitry 54 may enable communicating with a server that includes the database 44 that stores the revision information 36, 38, 40, and 42 used to generate the chip view 14.

The display 56 may include any suitable display circuitry that enables displaying information on a screen (e.g., light-emitting diodes, liquid crystal displays, plasma displays, organic light-emitting diodes, cathode ray tubes, etc.). As such, the display 56 may enable displaying the chip view 14 and other screens of the circuit design component 12. In addition, the display 56 may display various properties of the revisions 16, 18, 20, and 22, implementation details of the revisions 16, 18, 20, and 22, and/or various reports related to the revisions 16, 18, 20, and 22, among other things. In one embodiment, the display 56 may be a touch display capable of receiving inputs from a user of the computing device 46. It should be noted that the listed components are provided as example components and the embodiments described herein are not to be limited to the components described with reference to FIG. 2.

Figure 3:
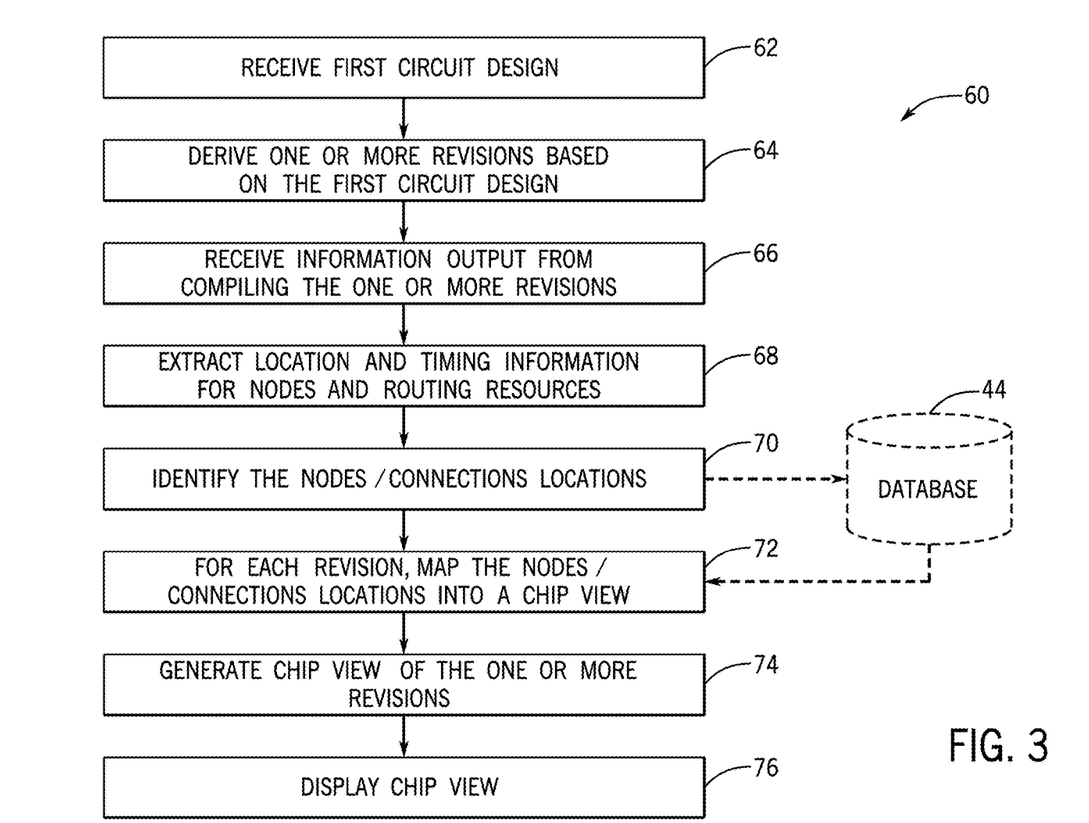
FIG. 3 illustrates a flow diagram of a process suitable for generating and displaying the chip view of FIG. 1, in accordance with an embodiment.

FIG. 3 illustrates a flow diagram of a process 60 suitable for generating and displaying the chip view 14 of FIG. 1, in accordance with an embodiment. Although the following description of the process 60 is described with reference to the processor 50 of the computing device 46, it should be noted that the process 60 may be performed by other processors disposed on other devices that may be capable of communicating with the computing device 46, such as a server, a cloud-based computing system, or other components associated with the system 10. Additionally, although the following process 60 describes a number of operations that may be performed, it should be noted that the process 60 may be performed in a variety of suitable orders and all of the operations may not be performed. It should be appreciated that the process 60 may be wholly executed by the computing device 46 or the execution may be distributed between the computing device 46 and/or a server or cloud-based computing system. Further, it should be understood that the process 60 may be implemented as computer instructions included in the circuit design component 12 stored on the memory 52.

Referring now to the process 60, the processor 50 may receive (block 62) the first circuit design 24. The first circuit design 24 may be provided by the designer and included in a project created in the circuit design component 12. The first circuit design 24 may represent the designer's original circuit design source code written in a high-level programming language. In some embodiments, the first circuit design 24 may be received from a source (e.g., server, cloud-based system) external to the computing device 46 via a communication network.

The processor 50 may derive (block 64) one or more revisions 16, 18, 20, and/or 22 based on the first circuit design 24. For example, once the first circuit design 24 is loaded into the project in the circuit design component 12, the designer may select various optimization options, settings, and/or placements to implement into different revisions 16, 18, 20, and/or 22 of the first circuit design 24. As discussed above, there are many combinations of optimization options, settings, and/or placements that may be chosen, and therefore, many revisions may be generated in the designer's project. Additionally or alternatively, the designer may initiate the retimer 26 to optimize the first circuit design 24. The retimer 26 may make certain circuit design changes to improve the performance of the circuit design, thereby generating one or more revisions 16, 18, 20, and/or 22. In either or both scenarios, during compilation of the revisions 16, 18, 20, and/or 22, the circuit design component 12 may dump revision information 36, 38, 40, and/or 42 into respective files 28, 30, 32, and/or 34.

As previously discussed, the revision information 36, 38, 40, and/or 42 may include resource location information and timing information related to paths of the revisions 16, 18, 20, and/or 22. Regarding the resource location information, each resource (e.g., node, partition, circuitry component) has a unique location (X, Y, and Z) on the chip implementing the revision 36, 38, 40, and/or 42. Regarding the timing information, the delay of the clock signal between nodes may be recorded to enable identifying the critical path (e.g., path with the longest delay between two nodes).

Accordingly, the processor 50 may receive (block 66) the files 28, 30, 32, and/or 34 generated during compilation of the revisions 16, 18, 20, and/or 22 and extract (block 68) location and timing information for any nodes and routing resources from the files 28, 30, 32, and/or 34. As previously discussed, the revision information 36, 38, 40, and/or 42 is included in the files 28, 30, 32, and/or 34 in a predefined format, which may enable the processor 50 to parse the file quickly in search of certain identifying tags (e.g., source node location tag, destination node location tag, delay tag) and extract the desired information.

The processor 50 may identify (block 70) the locations of the nodes and connections within the chip on which the revisions 16, 18, 20, and/or 22 are implemented based on the extracted location information. The connections may refer to the routing resources used to connect the nodes of the revisions 16, 18, 20, and/or 22. In some embodiments, the processor 50 may store the location and timing information in the database 44 for subsequent retrieval. The database 44 may be any suitable database, such as an SQL, Oracle, MySQl, and may be relational in nature.

The processor 50 may, for each revision 16, 18, 20, and/or 22, map (block 72) the nodes and connections locations into the chip view 14. In some embodiments, when the designer desires substantially immediate visualization of the chip view 14 after compilation of the revisions 16, 18, 20, and/or 22, the processor 50 may use the nodes and connections locations as soon as they are identified from the revisions information 36, 38, 40, and/or 42 without contacting the database 44. Additionally or alternatively, when the nodes and connections locations information are stored in the database 44 and the designer subsequently desires to analyze the chip view 14, then the processor 50 may query the database 44 for the desired information.

In any embodiment, after the processor 50 is in possession of the nodes and connections locations and has mapped the nodes and connections locations into the chip view 14 for each revision 16, 18, 20, and/or 22, the processor 50 may generate (block 74) the chip view 14 of the one or more revisions by drawing the nodes and connections in their respective locations on a virtual representation of the physical chip. In some embodiments, the processor 50 may draw the chip view 14 using JavaScript libraries, such as jsDraw2D, ChartDirector, drawing with canvas, or the like.

Further, the processor 50 may display (block 76) the generated chip view 14 on the display 56. In embodiments where the chip view 14 is generated in a server or cloud-computing system remote from the computing device 46 on which the circuit design component 12 is executing, the generated chip view 14 may be sent to the computing device 46 for display.

Figure 4:
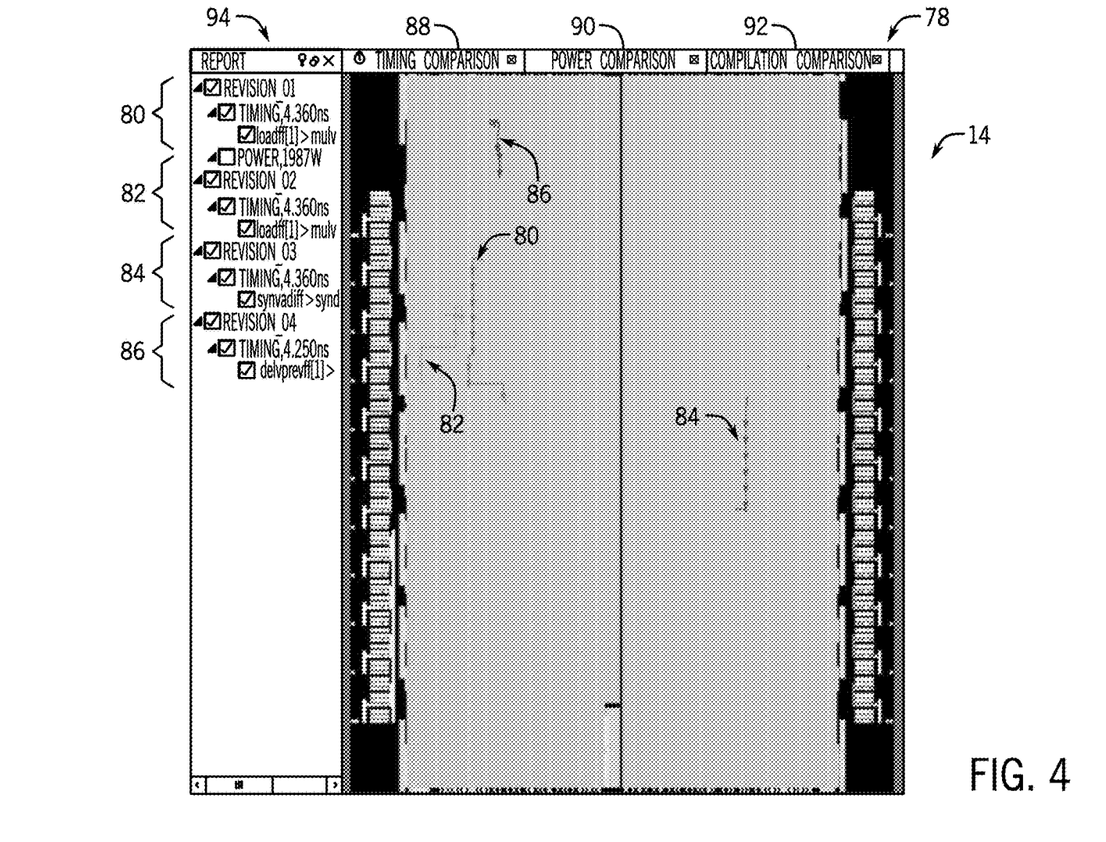
FIG. 4 illustrates a screenshot of an example of a chip view including multiple circuit design revisions, in accordance with an embodiment.

An example of a chip view 14 including multiple circuit design revisions is depicted in a screenshot 78 of FIG. 4, in accordance with an embodiment. The revisions in the chip view 14 may include a first revision 80, a second revision 82, a third revision 84, and a fourth revision 86. Although four revisions are depicted in the chip view 14, it should be understood that any suitable number of revisions may be visualized. The revisions 80, 82, 84, and 86 may be associated with a first circuit design 24 and may be included in the same project of the circuit design component 12. Each of the revisions 80, 82, 84, and 86 may include different optimization options, settings, and/or placements selected by the designer in an attempt to find the circuit design that satisfies certain criteria (e.g., timing). As depicted, the chip view 14 includes a visualization of a virtual chip that represents an actual physical chip on which the revisions 80, 82, 84, and/or 86 may be implemented. As may be appreciated, the chip view 14 enables the designer to visualize and analyze aspects of implementations that produce certain timing, power, and/or fitter (e.g., placement of specific nodes, partitions, and/or circuitry components) results for each revision 80, 82, 84, and 86 in an intuitive way.

The screenshot 78 also depicts three tabs along the top of the chip view 14 for timing comparison 88, power comparison 90, and compilation comparison 92. It should be noted that in some embodiments, additional tabs may be included as desired. For example, a tab related to a "fitter initial placement seed" may enable the designer to compare the blocks, partitions, and/or nodes placement and timing paths and/or power dissipation for various revisions with different fitter initial placement seeds. Further, the screenshot 78 depicts a reporting panel 94 along the left side of the chip view 14. In the depicted reporting panel, dropdown lists are displayed for each respective revision 80, 82, 84, and 86. The dropdown lists may include the name of the revision and result information related to timing, power, and/or compilation. Toggling checkboxes associated with each of the results may cause the drawings (e.g., critical paths, power consumptions, placements, etc.) for those results to be overlaid on the chip view 14. It should be understood that other results may be included in the dropdown list for the revisions, such as checkboxes for toggling the visualization of placement of specific nodes, partitions, and/or circuitry components of each respective revision 80, 82, 84, and 86.

In some instances, the designer may desire to just view information related to timing on the chip view 14, while in other instances, the designer may desire to view a combination of timing and power information for the revisions 80, 82, 84, and 86 or a subset of the revisions. It should be understood that the report panel 94 may enable the designer to pick and choose the information in any desirable combination and the appropriate drawings will be overlaid on the chip view 14.

Further, in some embodiments, the tabs 88, 90, and 92 may be linked to the dropdown lists in the report panel 94 in that selection of one of the tabs 88, 90, or 92 may cause the checkboxes in the report panel 94 that are associated with that tab to be selected by default. For example, because the timing comparison tab 88 is selected in the depicted screenshot 78, just the revision name, timing information of the critical path, and the nodes involved in the critical path are selected with checkmarks in the report panel 94, while the checkbox related to power is unselected. As a result, a visualization of the location of the source node and the destination node of the critical paths of the revisions 80, 82, 84, and 86, as well as the connections between the source nodes and the destination nodes, are displayed within the chip view 14. The designer may glean valuable information by the clear visual comparison in the chip view 14 of the actual locations of the critical paths of the revisions 82, 84, 86, and 88 as they may be implemented on an actual physical chip. For example, the designer may determine that one revision 82, 84, 86, or 88 has a more desirable delay (e.g., shorter) than the other revisions and may select to implement the optimization options, settings, placements, and/or circuit design changes that result in its critical path on the physical chip.

Although the chip view 14 is displayed as one example of a comparison report of numerous revisions 80, 82, 84, and 86, it should be appreciated that various other comparison reports are envisaged. For example, in some embodiments, some comparison reports may be in tabular format to highlight the assignments, optimization options, and/or settings differences between the various revisions 80, 82, 84, and 86. In such a tabular format, the details and results of each revision may be isolated from each other in respective tabbed columns.

Figure 5:
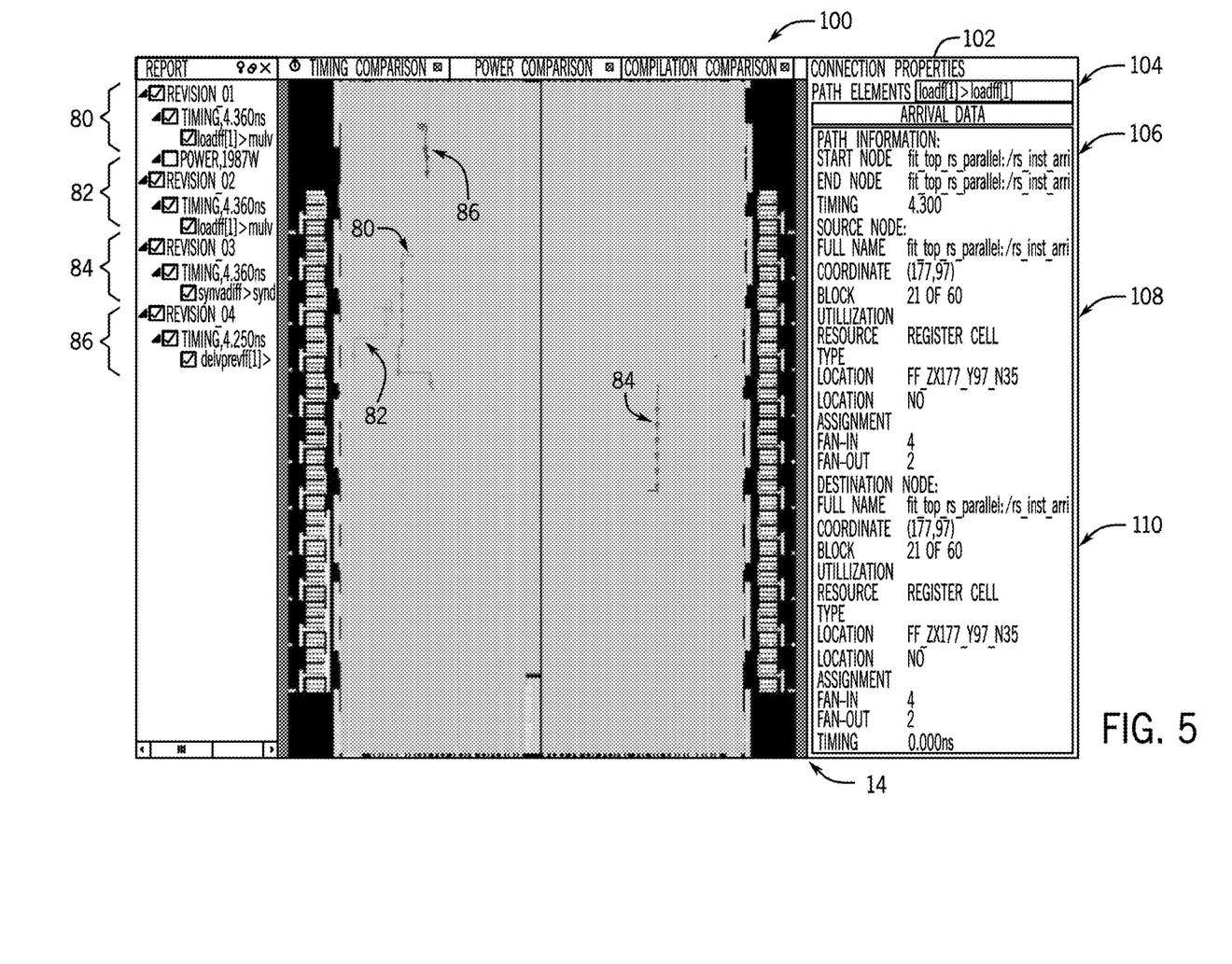
FIG. 5 illustrates a screenshot of an example of the chip view of FIG. 4 including a connection properties pane for a selected critical path, in accordance with an embodiment.

In addition, FIG. 5 illustrates a screenshot 100 of an example of the chip view 14 of FIG. 4 including a connection properties pane 102 for a selected critical path, in accordance with an embodiment. A dropdown list 104 for critical path elements may enable the designer to switch between critical paths of the revisions 80, 82, 84, and 86. As depicted, the critical path for revision 84 is selected and the connections properties pane 102 displays information related to the critical path 106, the source node 108, and the destination node 110. In particular, the critical path information 106 indicates the identity of the start node, the identity of the end node, and the timing delay (e.g., –4.340 nanoseconds). The source node information 108 and the destination node information 110 include the full name of the node, coordinates of the node on the chip, block utilization, resource type, location, location assignment, number of fan-ins, and number of fan-outs.

It should be understood that similar property panes may be displayed when the user selects information related to power and/or compilation for the various revisions 80, 82, 84, and 86. For example, if the user selects to see power properties of a certain revision, a properties pane may be displayed that shows the amount of power consumed by each resource in the selected revision, as well as any other suitable power information associated with the selected revision.

Figure 6:
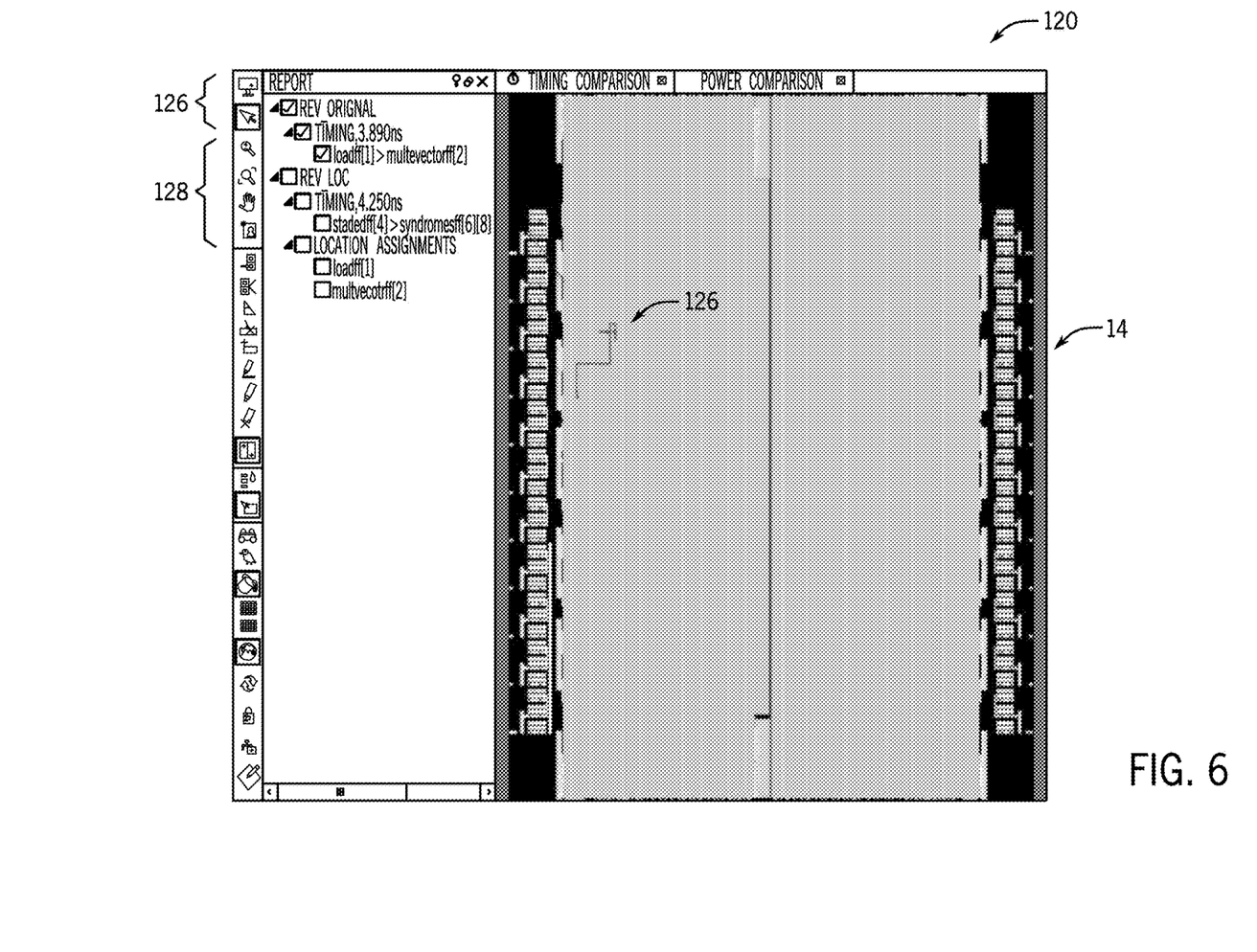
FIG. 6 illustrates a screenshot of an example of a chip view including an initial circuit design and a revision of the initial circuit design where the initial circuit design is selected to be displayed, in accordance with an embodiment.
Figure 7:
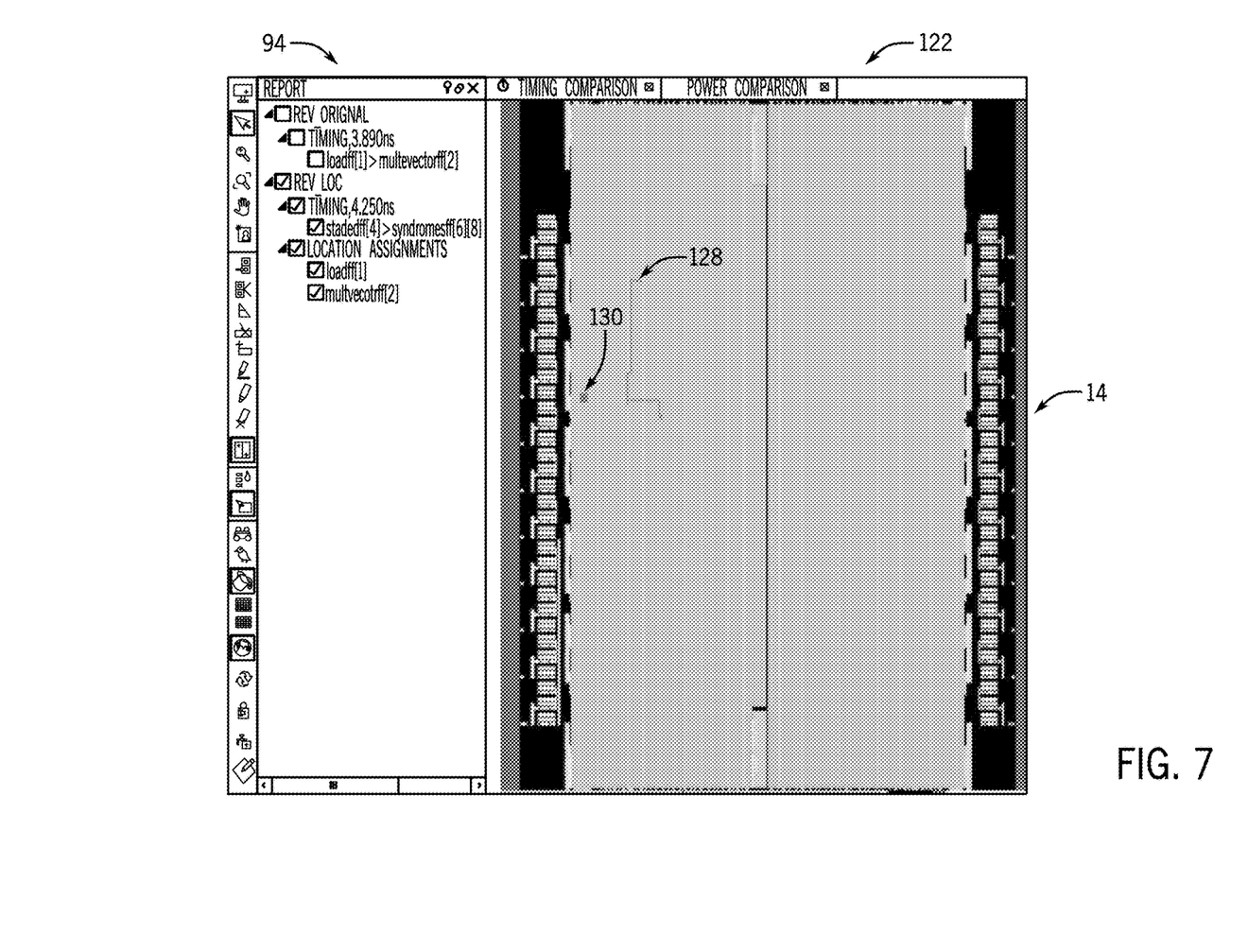
FIG. 7 illustrates a screenshot of an example of the chip view of FIG. 6 where the revision of the initial circuit design and location assignments of the revision are selected to be displayed, in accordance with an embodiment.
Figure 8:
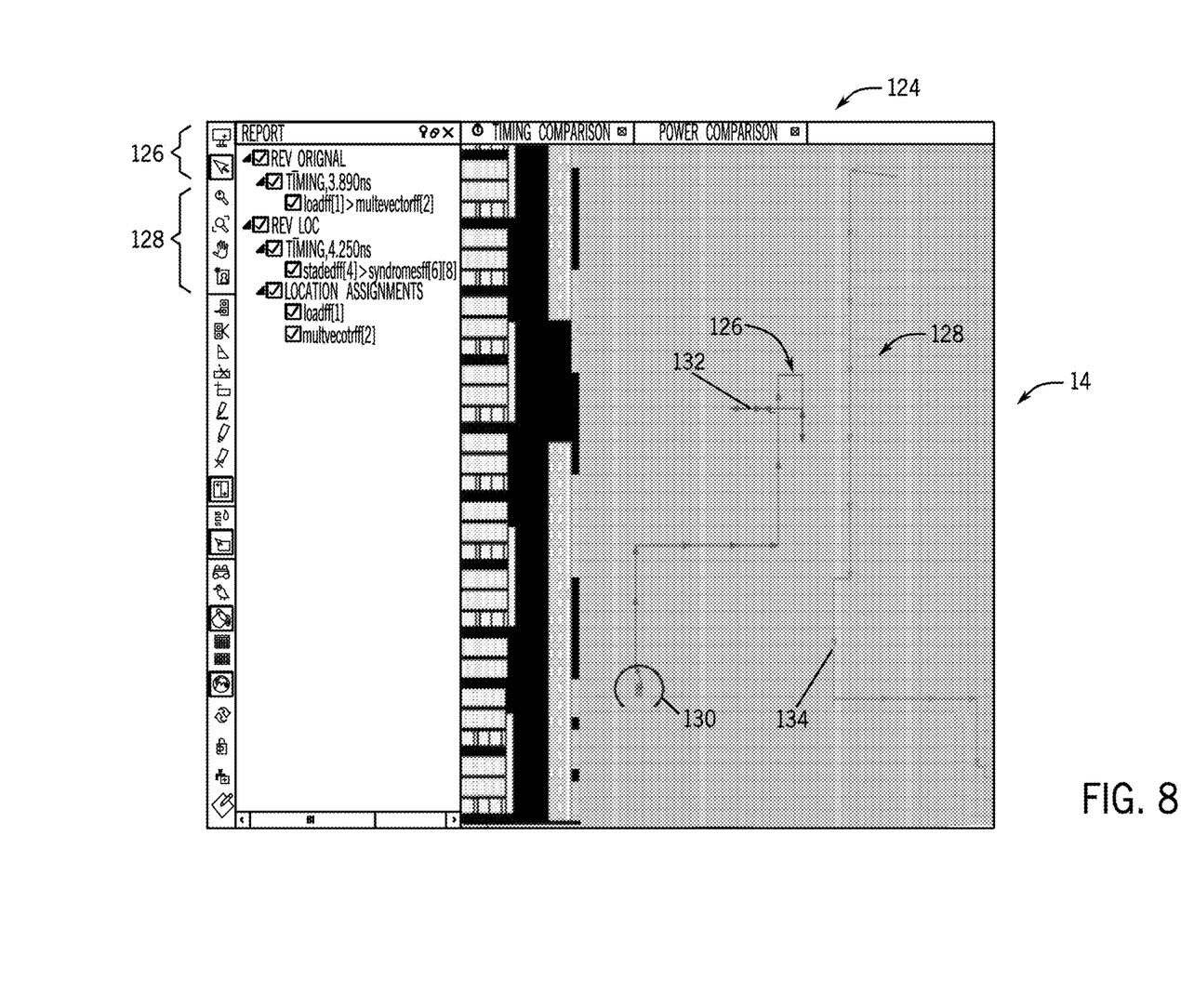
FIG. 8 illustrates a screenshot of an example of the chip view of FIG. 6 where the initial circuit design, the revision of the initial circuit design, and the location assignments of the revision are selected to be displayed, in accordance with an embodiment.

To further illustrate examples of embodiments of the present disclosure, FIGS. 6-8 illustrate screenshots 120, 122, and 124, respectively, of various chip views 14 of a project including two revisions 126 and 128, which are labeled as Rev_Original and Rev_LOC, respectively. The revision 128 includes constraints to the location of the nodes in critical paths. In particular, the nodes in critical paths of the revision 128 are assigned to locations nearer to one another. As may be appreciated in view of the description below, the FIGS. 6-8 enable a clear visualization and comparison of the outcomes of the constraint changes and an understanding of the relationship between the change and the outcome.

Starting with FIG. 6, the screenshot 120 illustrates an example of the chip view 14 where the revision 126 is selected to be displayed, in accordance with an embodiment. That is, because the checkboxes for the revision 126 are toggled "on" and the checkboxes for the revision 128 are toggled "off," the chip view 14 just shows the critical path reported for the revision 126.

In contrast, FIG. 7 illustrates the screenshot 122 including an example of the chip view 14 where just the revision 128 is displayed, in accordance with an embodiment. That is, because the checkboxes for the revision 128 are toggled "on" and the checkboxes for the revision 128 are toggled "off," the chip view 14 just shows the critical path reported for the revisions 128. Also, location assignments 130 of nodes closer to one another that were selected by the user are depicted in the chip view 14.

It should be noted, when the user selects the additional tabs for power comparison or compilation comparison, the reporting panel 94 enables the user to selectively choose the revisions whose respective information should be overlaid on the chip view 14. As may be appreciated, just one revision may be selected and overlaid on the chip view 14 in any of the reporting tabs (e.g., timing, power, compilation), or numerous revisions may be selected and overlaid on the chip view 14.

For example, FIG. 8 illustrates the screenshot 124 of an example of the chip view 14 of FIG. 6 where both revisions 126 and 128 are selected to be displayed, in accordance with an embodiment. It should be noted that the specification includes an enlarged portion of the chip view 14 including the revisions 126 and 128. The chip view 14 including both revisions 126 and 128 and their critical paths may enable a designer to visualize the impact of certain optimization options, settings, and/or placements to the outcome of the circuit implementation. As depicted, the revision 126 includes a critical path 132 where the clock signal is the slowest between two resources. After the designer constrained the nodes of the critical path to be located closer to one another for the revisions 128, the critical path 132 is removed, but a new critical path 134 is formed. Thus, the designer may visualize the direct impact of the location assignments 130 on the revision 128 of removing the critical path 132 from the revision 126 but creating a different critical path 134. In some instances, the designer may determine that the new critical path 134 meets certain criteria (e.g., timing) and selects to implement the circuit design of the revision 128.

Further, as discussed above, some embodiments of the present disclosure enable visualizing chip views 14 that include fitter placements that result from different selections of a fitter initial placement seed. For example, FIGS. 9 and 10 each illustrate a screenshot 140 and 142 of an example of a chip view 14 including a revision 144 and 146, respectively, with varying node placements as a result of different fitter initial placement seed settings, in accordance with an embodiment. The fitter initial placement seed may specify the starting value a fitter uses when randomly determining the initial placement for the current circuit design. The value of the fitter initial placement seed may be any non-negative integer value. Changing the starting value may or may not produce fitting that is better in some sense (e.g., reduces delays or critical paths). In some instances, the starting value should be specified when the fitter is not meeting desired timing criteria by a small amount. Modifying the circuit design or settings in the circuit design component 12 even slightly may change which seed is best for the design.

Figure 9:
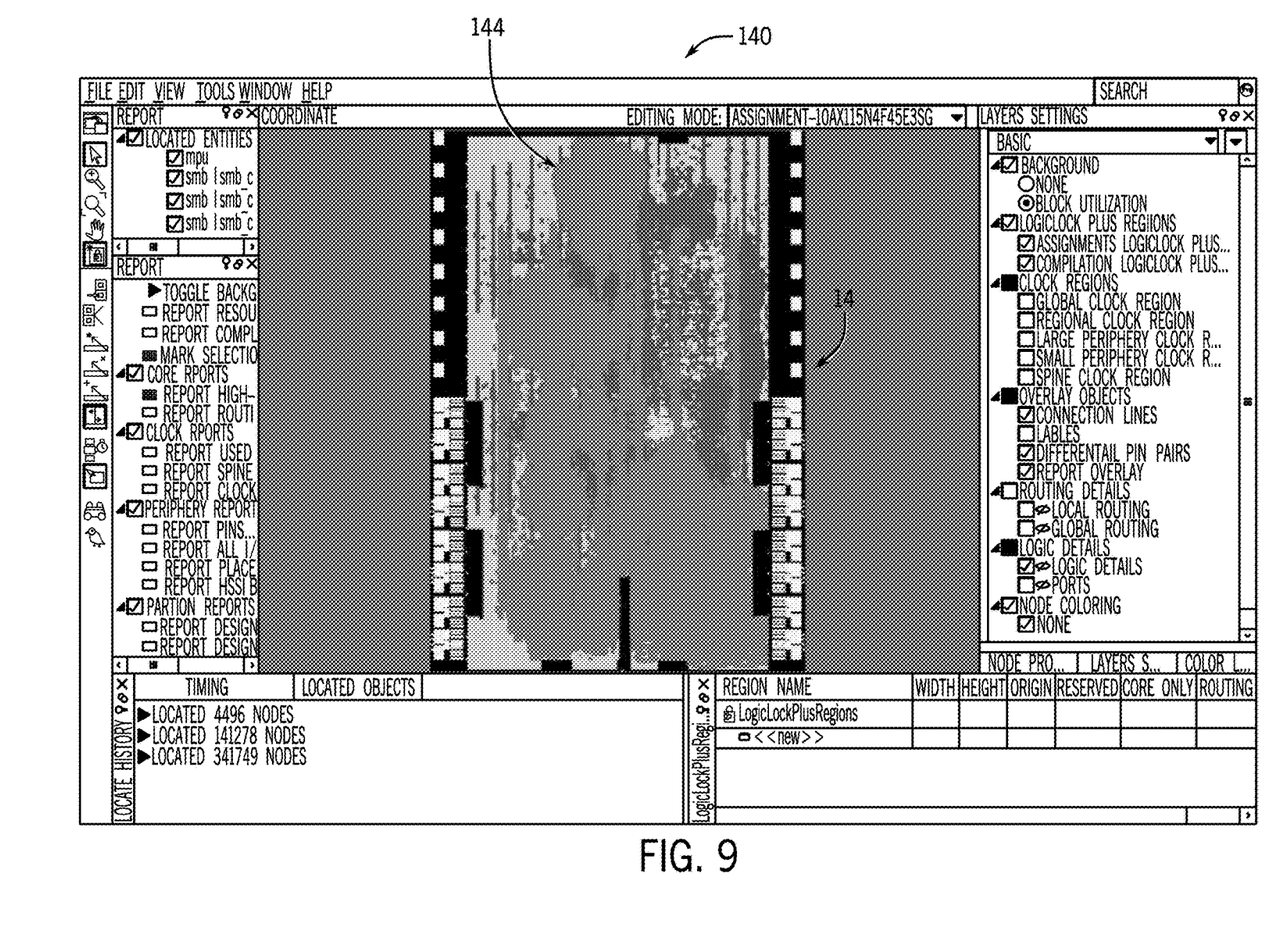
FIGS. 9 and 10 each illustrate a screenshot of an example of a chip view including multiple revisions with varying node placements as a result of different seed settings, in accordance with an embodiment.
Figure 10:
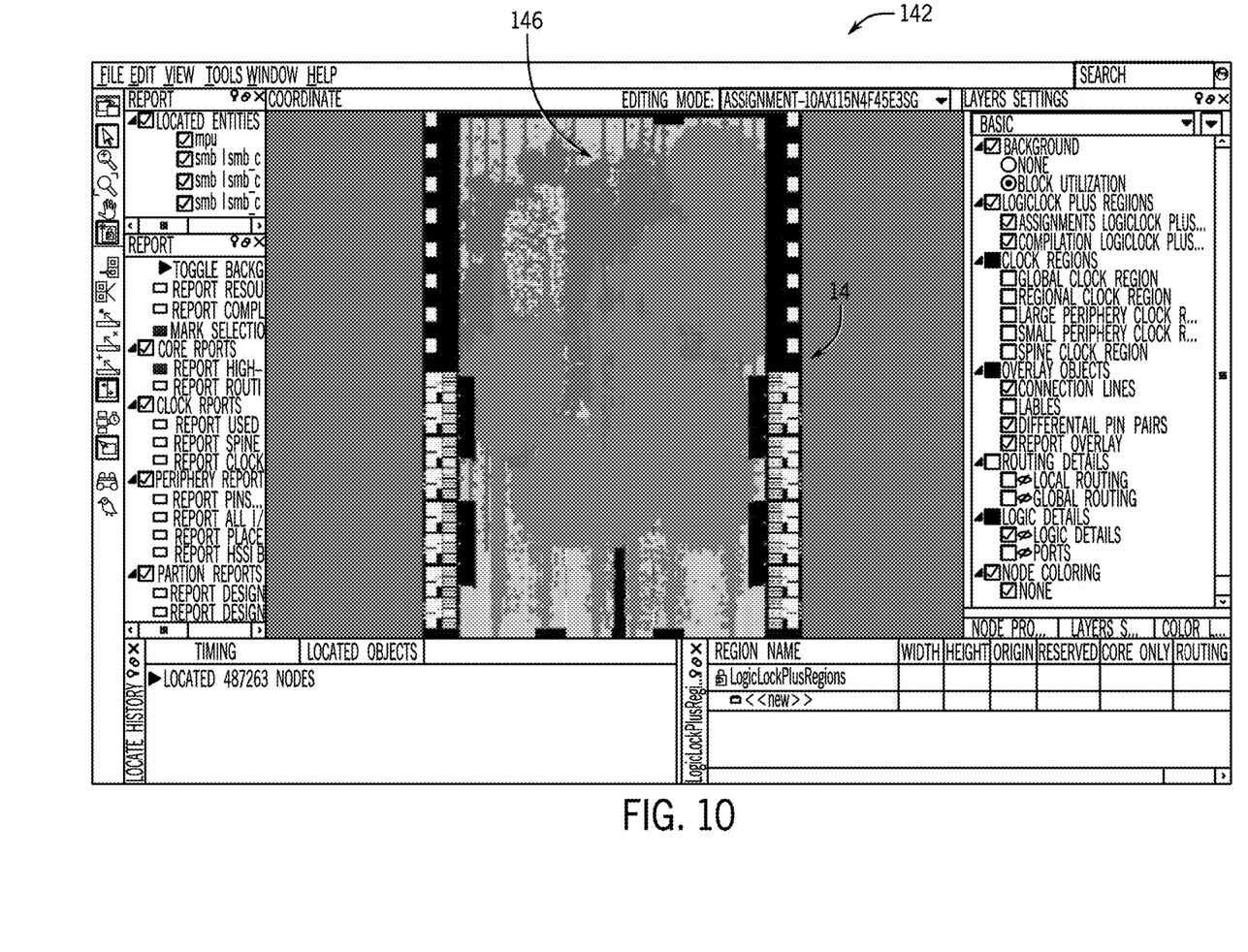

In the screenshot 140 of FIG. 9, the fitter initial placement seed is set to 1, which may be a default setting. In the screenshot of FIG. 10, the fitter initial placement seed is set to 123. Both revisions 144 and 146 include similar project settings except for the fitter initial placement seed. However, as depicted, the fitter placement of blocks, partitions, and/or nodes of the revision 144 and the revisions 146 vary fairly substantially as a result of the different fitter initial placement seed. Thus, the chip view 14 including the actual placement of blocks, partitions, and/or nodes may enable the designer to visualize and compare the revisions 144 and 146 that result from different fitter initial placement seeds. Also, the chip view 14 may enable the designer to visualize and compare timing paths and power dissipation of revisions with different fitter initial placement seeds.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A computer-implemented method, comprising:
receiving a first circuit design;
deriving a plurality of circuit design revisions comprising one or more resources based on the first circuit design, wherein the one or more resources comprise one or more partitions, one or more nodes, one or more logic blocks, or any combination thereof;
receiving revision information for each of the plurality of circuit design revisions that are output as a result of compilation of the plurality of circuit design revisions;
extracting location information, timing information, or both for the one or more resources from the revision information, wherein the timing information is indicative of one or more critical paths of the plurality of circuit design revisions;
for each of the plurality of circuit design revisions, mapping the one or more resources into a chip view based on the location information, the timing information, the revision information, or any combination thereof, wherein the chip view comprises a virtual visualization of an actual physical chip and the one or more resources are mapped to one or more actual locations on the virtual visualization as they would be implemented on the actual physical chip;
generating the chip view of at least two circuit design revisions of the plurality of circuit design revisions that displays a report specific to one or more properties of the at least two circuit design revisions of the plurality of circuit design revisions, wherein the chip view comprises the timing information; and
presenting the chip view via an electronic display.

2. The method of claim 1, wherein the virtual visualization is of a portion of the actual physical chip.

3. The method of claim 1, wherein the one or more resources comprise one or more routes, one or more connections, one or more placements, or any combination thereof.

4. The method of claim 1, wherein the one or more properties comprise timing delay of the one or more critical paths, power dissipation, one or more fitter placements, or any combination thereof.

5. The method of claim 4, comprising displaying a respective tab related to each of the one or more properties for the report that enables comparison of an implementation of the one or more resources of the at least two circuit design revisions that results in the one or more properties.

6. The method of claim 1, comprising receiving one or more selections of one or more optimization options, one or more settings, one or more resource placements, or some combination thereof prior to deriving the plurality of circuit design revisions.

7. The method of claim 1, wherein the one or more resources comprise the one or more nodes and one or more physical routings, and wherein generating the chip view comprises drawing the one or more nodes and the one or more physical routings at one or more locations based on the mapping.

8. The method of claim 1, wherein the one or more properties comprise a fitter initial placement seed setting and the report in the chip view is configured to visualize one or more placements of the logic blocks, one or more placements of the one or more partitions, one or more placements of the one or more nodes, one or more timing paths, power dissipation, or some combination thereof based on the fitter initial placement seed setting for each of the at least two circuit design revisions of the plurality of circuit design revisions.

9. The method of claim 1, wherein the one or more properties comprise one or more physical placements of one or more specific nodes, the one or more partitions, the one or more logic blocks or some combination thereof in the chip view for the at least two circuit design revisions of the plurality of circuit design revisions displayed in the report.

10. The method of claim 1, wherein extracting the location information comprises parsing a predefined format of the revision information for one or more specific tags comprising one or more source node location tags, one or more destination node location tags, one or more delay tags, or any combination thereof.

11. A tangible, non-transitory, computer-readable medium, comprising instructions that, when executed by a processor, cause the processor to:
receive a first circuit design;
derive a plurality of circuit design revisions comprising one or more resources based on the first circuit design, wherein the one or more resources comprise one or more partitions, one or more nodes, one or more logic blocks, or any combination thereof;
receive revision information for each of the plurality of circuit design revisions that is output as a result of compilation of the plurality of circuit design revisions;
extract location information, timing information, or both for the one or more resources of the plurality of circuit design revisions from the revision information, wherein the timing information is indicative of one or more critical paths of the plurality of circuit designs revisions;
for each of the plurality of circuit design revisions, map the one or more resources into a chip view based on the location information, the timing information, the revision information, or any combination thereof, wherein the chip view comprises a virtual visualization of an actual physical chip and the one or more resources are mapped to one or more actual locations on the virtual visualization as they would be implemented on the actual physical chip;
generate a report configured to display the chip view of at least two circuit design revisions of the plurality of circuit design revisions, wherein the chip view is configured to enable a comparison of one or more properties that result from implementing the at least two circuit design revisions of the plurality of circuit design revisions, wherein the report comprises one or more tabs specific to the one or more properties of the at least two circuit design revisions of the plurality of circuit design revisions to be overlaid on the chip view in response to being selected; and
presenting the chip view via an electronic display.

12. The computer-readable medium of claim 11, wherein the one or more properties comprise one or more physical placements of one or more specific nodes, the one or more partitions, the one or more logic blocks, or any combination thereof.

13. The computer-readable medium of claim 11, wherein the virtual visualization is of a portion of the actual physical chip.

14. The computer-readable medium of claim 11, wherein the one or more properties comprise a timing delay of the one or more critical paths of the at least two circuit design revisions, power dissipation of the one or more resources, one or more fitter placements of the one or more resources of the at least two circuit design revisions, or any combination thereof.

15. The computer-readable medium of claim 11, wherein the one or more resources are derived based on a first circuit design by receiving one or more circuit design changes as a result of retiming the first circuit design or receiving one or more selections of one or more optimization options, one or more settings, one or more resource placements, or any combination thereof.

16. The computer-readable medium of claim 12, wherein the one or more properties comprise a fitter initial placement seed setting and the chip view visualizes one or more placements of the one or more logic blocks, one or more placements of one or more partitions, one or more placements of the one or more nodes, one or more timing paths, power dissipation, or any combination thereof based on the fitter initial placement seed setting for each of the at least two circuit design revisions of the plurality of circuit design revisions.

17. An electronic device, comprising:
a processor that executes instructions that cause the processor to:
generate a chip view of one or more resources of a plurality of circuit design revisions, wherein the chip view comprises a virtual visualization of an actual physical chip and the one or more resources mapped to one or more actual locations on the virtual visualization as they would be implemented on the actual physical chip, and wherein the chip view is configured to enable a comparison of at least two implementations of at least two circuit design revisions of the plurality of circuit design revisions that result in one or more properties; and
present the chip view via display circuitry, wherein the chip view comprises critical path information configured to indicate a timing delay associated with the one or more resources; and
a memory that stores the instructions.

18. The electronic device of claim 17, wherein the one or more properties include one or more placements of one or more nodes, one or more placements of one or more partitions, one or more placements of one or more logic blocks, one or more placements of one or more timing paths, power dissipation, or any combination thereof.

19. The electronic device of claim 18, wherein the one or more properties are displayed for two or more different fitter initial placement seeds.

* * * * *